United States Patent [19]

Basil

[11] Patent Number: 4,832,603

[45] Date of Patent: May 23, 1989

[54] TEACHING AID AND DAILY FOOD CONSUMPTION PLANNER

[76] Inventor: Jason M. Basil, 5476 Falcon La., West Chester, Ohio 45069

[21] Appl. No.: 212,507

[22] Filed: Jun. 28, 1988

[51] Int. Cl.$^4$ .......................... G09B 1/04; G09B 19/00
[52] U.S. Cl. .................................................. 434/127
[58] Field of Search ............................... 434/127, 430

[56] References Cited

U.S. PATENT DOCUMENTS

| | | |
|---|---|---|
| 2,431,827 | 12/1947 | Rado . |
| 3,681,857 | 8/1972 | Yardley . |
| 3,769,720 | 11/1973 | Terrones ............................ 434/127 |
| 3,841,260 | 10/1974 | Sharp et al. . |
| 4,148,273 | 4/1979 | Hollingsworth et al. . |
| 4,251,936 | 2/1981 | Ferrell . |
| 4,310,316 | 1/1982 | Thomann ............................ 434/127 |
| 4,460,179 | 7/1984 | Hafer ................................. 434/127 |
| 4,650,218 | 3/1987 | Hawke ............................ 434/127 X |
| 4,652,241 | 3/1987 | McCarty ............................ 434/127 |
| 4,689,019 | 8/1987 | Tilney ............................... 434/127 |

Primary Examiner—William H. Grieb

Attorney, Agent, or Firm—Wood, Herron & Evans

[57] ABSTRACT

A unique diet control system utilizes a display panel and a plurality of movable members mounted upon the display panel. The display panel has seven food group display zones across the top of the panel and six meal display zones across the bottom. The meal display zones are each divided into three parallel columnar zones, one of which contains a list of all of the food groups, the second of which is adapted to receive a numerical designation of the number of food units of each group to be consumed during each meal, and the third of which is adapted to receive movable members indicative of choices of consumable foods and portions of food within each food group. Movable members are contained within each food group zone. Displayed on each of the movable members is a quantity and choice of food to make up one unit of food of a food group. The movable members are movable from the food group zone to the third column of the metal zone in the numbers displayed in the second column of the metal zone so as to display the choice of selected foods for each meal as well as the quantities of those choices.

3 Claims, 2 Drawing Sheets

FIG. 1

TEACHING AID AND DAILY FOOD CONSUMPTION PLANNER

This invention relates to diet control systems, and more particularly, to teaching aids for use in connection with diabetic diet control systems.

A characteristic of all diabetics or persons subject to diabetes is that their blood sugar level must be very accurately controlled. To that end, it is common practice for a medical doctor to prescribe a regular dosage of insulin to be taken by the diabetic in order to maintain that blood sugar level. But, even though the prescribed insulin dosage is taken and exactly followed, blood sugar levels of the diabetic will vary depending upon food intake and patient activity. Therefore, in order to obtain the necessary control of the diabetic's blood sugar level, it is important not only that the prescribed insulin dosage be maintained, but also that a specific diet be accurately followed.

Because of the necessity for accurately establishing and then maintaining a diabetic's diet, it is not uncommon for medical practitioners to hospitalize a diabetic immediately upon diagnosing diabetes, particularly in children, in order to bring the patient's diet under control. That control requires that the patient follow a program of consuming daily prescribed quantities of each of seven different food groups. Those seven food groups are breads, fruits, meats, fats, vegetables, milk, and so-called "free" foods.

In order to teach patients which foods are contained within each group and how much or the quantity of food within each group to be consumed at each meal in order to maintain a prescribed blood sugar level, the patients are now given a book published by the American Diabetic Association for use by diabetics, which sets forth the different foods contained in each food group, as well as the quantity of food in one particular unit or portion of each food group. Another publication which contain very nearly identical information relative to exchange groups of foods is a publication of the U.S. Department of Agriculture entitled *Nutritive Value of American Foods—Agricultural Handbook No. 8*. When diabetics are initially diagnosed, they are taught how to use these handbooks in order to maintain a diet prescribed by a medical doctor. In the case of children, the patients are generally hospitalized until they and their parents understand the book and know how to use it without error. Because the penalty for misapplying the information contained in the book is so severe, i.e., illness, followed by blindness, etc., patients often remain hospitalized for much longer than is medically necessary to stabilize their insulin and food intake simply to ensure that the patient learns and understands the booklet and its use.

The difficulty with the use of a booklet for teaching diet control is that it is time consuming to use and subject to error. It is also difficult for a doctor to know when a patient has departed from the diet until such time as an abnormal blood sugar level is diagnosed. At that time, though, cumulative adverse effects from the lack of a controlled diet may have permanently adversely affected the patient's health.

It has therefore been an objective of this invention to provide an improved teaching aid and daily food consumption planner which will enable a diabetic or any other person to accurately follow a prescribed diet.

Still another objective of this invention has been to provide such a teaching aid and daily food planner which may be utilized by children with a very minimum of instruction in its use. Thereby, the hospitalization period for a young patient may be substantially reduced.

Yet another objective of this invention has been to provide a teaching aid and daily food planner which eliminates the need for constant reference to a manual or book in order to follow a prescribed diet.

According to the practice of this invention, these objectives have been achieved by a system which includes a display panel or display board and has a plurality of movable members attachable to and movable to different zones of the board. The board is divided into zones, there being seven zones across the top, each one of which is representative of one of the seven food groups, i.e., breads, fruits, meats, fats, vegetables, milk and free foods. The lower section of the board is divided into zones representative of all of the meals and snacks of a day, i.e., breakfast, a.m. snack, lunch, p.m. snack, dinner and evening snack. Each of the meal and snack zones is in turn divided into three parallel columns. One of these columnar zones in each meal or snack zone contains a list of all of the food groups. The second parallel columnar zone in each meal or snack zone is adapted to receive a numerical designation or prescription of the number of units of each of the food groups to be consumed at the designated meal. The third parallel columnar zone in each of the meal and snack zones is adapted to receive movable members indicative of choices and quantities of consumable foods within each food group. The movable members are initially located in the seven food group zones with the movable members of each zone being distinctive relative to the movable members of the other food group zones. Preferably, the movable members of the same food group are all of the same color and different from the color of the movable members of all of the other zones. Displayed on each movable member in numerical and alphabetical form is a choice and quantity of food within each food group. For example, within the bread group zone, the movable members might have displayed thereon "one slice of bread," "one-half bagel," "six vanilla wafers," "one-third cup of rice," or "three graham crackers." Within the meat group zone, the movable members might have displayed thereon "one ounce chicken," "one slice bologna," "one ounce beef," etc.

In the course of using this teaching aid and daily food planner, the person using the planner, or a physician or a dietician, writes in the prescribed number of portions or units of each of the food groups to be consumed at each meal. For example, the person might write in the second column of the breakfast zone the numbers "2" opposite bread, "1" opposite meat, and "1" opposite fat. The patient might also write in the second column of the a.m. snack zone the number "1" opposite bread and the number "1" opposite fruit. This would indicate that for breakfast the person using the planner could have any two of the choices of foods displayed on the movable members in the bread zone, and upon selecting those choices, the person would move the movable members to the third columnar zone of the breakfast meal zone to indicate either the selection of those choices or the consumption of those choices. The person using the teaching aid and daily food planner would follow this same procedure with respect to the a.m. snack; that is, he would select from the bread zone following this example one choice of bread and one choice of fruit and would move the movable members which display that choice from the upper food group display zones down to the third column of the a.m. snack zone. By following this procedure, a person may very easily, conveniently and accurately follow a prescribed diet.

These and other objects and advantages of this invention will be more readily apparent from the following description of the drawings in which:

FIG. 1 is a perspective view of a teaching aid and daily food planner embodying the invention of this application.

Figure 2:
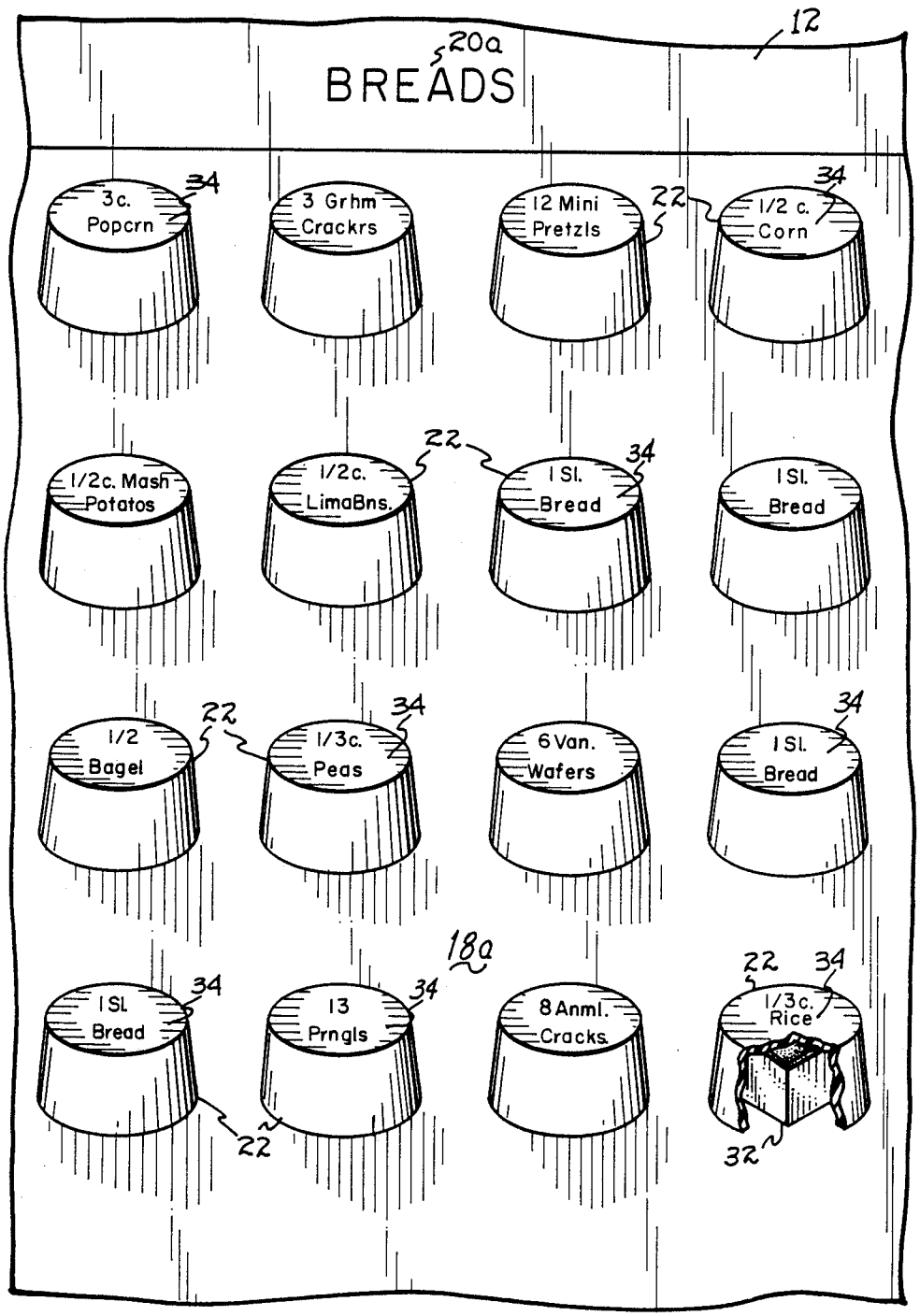
FIG. 2 is an enlarged perspective view of one food group zone of the planner of FIG. 1.

While the invention of this application is described in connection with a teaching aid and daily food planner for use by diabetics, it should be appreciated that the invention is equally applicable to the maintenance of a diet for persons other than diabetics. Accordingly, it should be understood that the invention of this application is not limited to use by diabetics or for teaching diabetics to control their diet, but may be used for the population at large. It does, though, solve a problem which is particularly acute in the case of diabetics, and especially youthful diabetics.

Figure 1:
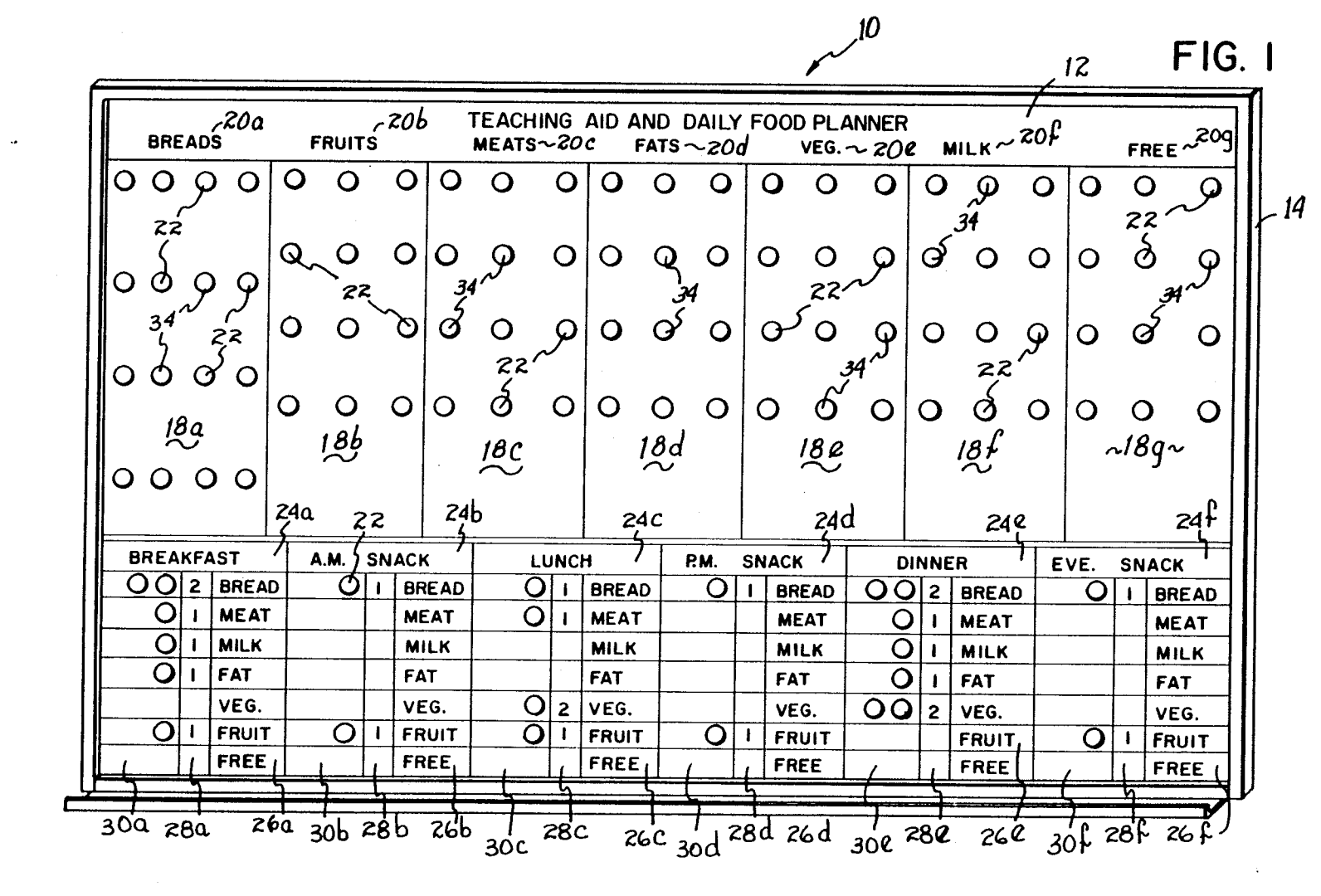

With reference first to FIG. 1 there is illustrated a teaching aid and daily food planner 10 in the form of a panel or board having a large front surface display area. In the preferred embodiment of this invention, this panel 10 comprises a sheet 12 of ferrous metal, the front face of which is painted or coated with a surface coating upon which indicia or printed matter is particularly distinctive. In the preferred embodiment, the front face is painted white, and the printing, which appears thereon, is printed in a black ink. There is preferably a border 14 which extends around the periphery of the panel 12, and a shelf or ledge 16 extending forwardly from the bottom edge of the border 14.

The upper portion of the front face 12 of the panel 10 is divided into seven food group zones 18a–18g. Each of these zones is identified by an individual food group heading 20a–20g. These headings 20a–20g identify the zone 18a as a "breads" food group zone, the zone 18b as a "fruits" food group zone, the zone 18c as a "meats" food group zone, the zone 18d as a "fats" food group zone, the zone 18e as a "vegetable" food group zone, the zone 18f as a "milk" food group zone, and the zone 18g as a "free" food group zone. In the preferred embodiment, each zone is of the same area and the same dimensions, although the zones could be of differing size, depending upon the number of movable members 22 to be displayed thereon.

The lower portion of the front face of the display panel 10 is divided into six meal or snack zones indicative of each of the meals or snacks during the course of the day. These six meal zones 24a–24f are each identified by a zone heading. The zone 24a is designated with a heading "Breakfast," the zone 24b is designated with a heading "A.M. Snack," the zone 24c is designated by a heading "Lunch," the zone 24d is designated with a heading "P.M. Snack," the zone 24e is designated with a heading "Dinner," and the zone 24f is designated with a heading "Evening Snack." Each meal zone is in turn divided into three columns or columnar zones beneath each meal heading. One of these columns, the rightwardmost one in each meal zone, 24a–24f, contains a listing of each of the seven food groups. Immediately to the left of the columns 26a–26f in each of the meal zones 24a–24f there is a portion or units column or columnar zone which is adapted to have printed therein the number of units or portions of each food group to be consumed during each meal. Immediately to the left of the food portions designating columns 28a–28f there is a third food selection columns or columnar zones 30a–30f. This third column 30a–30f is intended for the reception of movable members 22 to indicate choices or selections of foods within each food group.

Contained within each food group zone 18a–18g there are a plurality of movable members 22. In the preferred embodiment, each of these movable members is shaped as a disc having a magnet 32 embedded in the underside thereof. This magnet functions to hold each of the movable members 22 against the front face 12 of the sheet metal panel 10.

With reference now particularly to FIG. 2, it will be seen that each of the movable members 22 has printed in numerical form on the front face 34 thereof a quantity and in alphabetical form a description of one choice of food making up one unit of food within a food group. The quantities or portions of each individual food choice of each group is taken from and based upon the food group exchanges which have been standardized by the U.S. Department of Agriculture in its *Nutritive Value of American Foods—Agricultural Handbook No. 8*, or the substantially identical exchange list employed by the American Diabetic Association for use by diabetics in assuring the consumption of well balanced diets. In FIG. 2 there is illustrated the movable members contained within the "breads" zone 20a. These movable members are all of the same color so that they are easily identified and easily replaced into the proper zone after removal and replacement in one of the lower meal zones 24a–24f as explained more fully hereinafter. The colors of the movable members 22 within each zone 20a are all the same within one zone or food group, but are each distinctive and different from the colors of the other movable members 22 of the other zones. For example, the breads food group movable members might all be orange, the fruits movable members might all be red, the meats movable members 22 might all be yellow, the fats movable members might all be blue, the vegetable movable members might all be green, the milk movable members might all be white, and the free foods movable members 22 might all be brown. Of course, the choice of colors is arbitrary, but the point is that each plurality of movable members 22 within each food group is of the same color and is distinctive and different from the colors of the movable members contained in the other food group zones.

The choices of food which appears on the front face 34 of each movable members 22 and the portions thereof which appear in association with each choice are, as explained hereinabove, taken from the exchange list of the American Diabetic Association or from the publication of the U.S. Department of Agriculture entitled *Nutritive Value of American Foods—Agricultural Handbook No. 8*. In theory, all of the possible choices of bread units or portions would be contained on at least one of the movable members 22 within the breads zone 20a, and all of the fruits choices and portions would appear on one of the movable members within the fruits zone 18b. In practice, however, only the most popular ones of those choices, or the ones of those choices which would be acceptable to the person using the particular teaching aid and daily food planner 10, would be utilized on the movable members 22 since there is limited room in each zone for movable members of sufficient size to display the relevant information, i.e., quantity and choice of food on the face 34 of the movable member.

In the use of the teaching aid and daily food planner of FIG. 1, all of the movable members 22 would initially be placed in the appropriate zones of the food group display zones 18a-18g. A medical doctor or a dietician or the person planning his own diet would first mark in the second column 28a-28f of the meal zones 24a-24f the number of units of each of the food groups to be consumed at a designated meal. For example, with reference to FIG. 1, that person would mark in the breakfast zone 24a two bread units, one meat unit, one milk unit, one fat unit, and one fruit unit. That person would also designate or mark in the second column 28b of the a.m. snack zone the number of units or portions of each food group to be consumed at the a.m. snack. In the example illustrated in FIG. 1, the number "1" would be marked in opposite the bread unit, and the number "1" opposite the fruit unit. This procedure of marking up the number of units or portions of food to be consumed in each food group for each meal would be repeated for each of the meals of the day. The person or patient utilizing the teaching aid and daily food planner would then, in the course of using the planner, review the choices of foods in each food group zone and select the choices of food which that person desired for each meal or snack of the day. That person would then remove the selected removable members 22 from each zone 18a-18g and move those movable members to the third column 30a-30f opposite the food group contained in the column 26a-26f of the meal zones 24a-24f. For example, the person would select from the bread zones 18a two bread items and move them to the column 30a opposite the bread designation of column 26a. The person would remove from the milk zone 18f a selected movable member 22 from that zone and place it in the column 30a opposite or to the left of the milk designation contained in column 26a. This procedure would be repeated for each food group, opposite which there is a numerical designation in the column 28a-28f. After having selected all of the choices of food for each meal of the day to conform to the food portions contained in each of the designation columns 28a-28f, the person would then simply at each meal consume those particular choices of foods in the quantities identified on the face 34 of each movable member contained in the columns 30a of the meal zones 24a-24f. Thereby, the person using the planner 10 would automatically conform his diet to the portions and groups of foods specified by the doctor or dietician when that person completed the numerical designations of column 28a-28f for each meal. The result would be a well-balanced, healthful diet which could be very accurately and closely controlled.

As an alternative to utilizing the teaching aid and daily food planner 10 of this invention to plan all of the meals of a day so as to conform those meals to a particular diet as prescribed in the food portions column of each meal zone 24a-24f, this planner 10 may be used at each mealtime to select food choices in the proper number of units or portions for the meal. In that event, the person using the planner would simply move the selected movable members 22 from the food group zones 18a-18g into the food selection column 30a-30f of the meal zones as those items of food were consumed during each meal or snack. In that event, this planner would still be used to accurately and precisely control the diet and to ensure that no greater number of units of any particular food group and no non-prescribed items of food were consumed at each meal.

In describing the preferred embodiment of this invention, the movable members 22 have been described as being of differing color within each food group. Rather than using differing colors to designate the movable members of each food group, through, the movable members 22 would be of the same cross-sectional configurations within each group, but of different and distinctive cross-sectional configuration from one food group to another. For example, if differing cross-sectional configurations were to be used in lieu of differing colors for the movable members 22 of the different food groups, then the breads designating movable members 22 might all be round, the fruits designated movable members might all be square, the meats movable members might all be hexagonal, etc. Furthermore, rather than utilizing printed indicia on the face 34 of the movable members to indicate quantities and choices of foods, braille indicia might be utilized or other symbols utilized to convey the same information.

While I have described only a single preferred embodiment of my invention, I do not intend to be limited except by the scope of the following appended claims:

I claim:

1. A food intake teaching aid and daily planner comprising
   a display panel,
   said panel having a first plurality of food group display zones corresponding to all of the food groups,
   said panel having a second plurality of meal display zones corresponding to all of the meals of a predefined period of time, each of said second plurality of display zones being subdivided into three parallel columnar zones, one of said columnar zones in each of said plurality of meal display zones containing a list of all of the food groups, a second one of said parallel columnar zones in each of said plurality of meal display zones being adapted to contain a numerical designation of the number of units of each of said food groups to be consumed at a particular meal designated by the meal zone within which said second parallel columnar zone is contained, and a third one of said parallel columnar zones in each of said plurality of meal display zones being adapted to receive movable members indicative of choices of consumable food and portions of food within said food group,
   a plurality of readily identifiable movable members, each of said movable members corresponding to a predefined food group and unit portion of food within said group, and each of said movable members having numerical and alphabetical indicia thereon indicative of the quantity and choice of food within one food group to make up one unit portion of food within said group, and
   whereby movable members corresponding to each choice and portion of food within each group to be eaten at each meal may be selected from one of said first plurality of food group zones and moved from said first plurality of food group display zones to the third columnar zone of said second plurality of display zones to indicate the choice and number of units of food within each group to be consumed or which has been consumed within each food group at each meal.

2. The teaching aid and daily planner of claim 1 wherein each of said movable members having indicia thereon indicative of food choices in one food group are all of the same color and all of the movable members having indicia thereon indicative of one food group are of a distinctive color.

3. A method of teaching the control of daily food intake of an individual utilizing a display panel and a plurality of movable members, which display panel has a first plurality of food group display zones corresponding to all of the food groups and a second plurality of meal display zones corresponding to all of the meals of a predefined period of time, the second plurality of meal display zones each being subdivided into three parallel columns with the first of said columns in each meal display zone containing a list of all of the food groups, the second of said columns in each meal display zone being adapted to receive a numerical designation of the number of units of each of said food groups to be consumed at a designated meal, and the third column in each meal zone being adapted to receive one or more of said movable members, and which movable members have displayed thereon indicia indicative of a food group and of the choice and quantity of food to make up one unit portion of food within said food group, which method comprises marking in said second column of each of said meal zones the number of units of each of said food groups to be consumed at a designated meal, initially positioning all of said movable members in said first plurality of food group zones with each movable member contained within the zone of the appropriate food group designated by indicia of the movable members, reviewing and deciding from the plurality of movable members contained within each food group which of the food choices displayed on the movable members is to be consumed at each meal, removing from the food group display zones selected movable members of the food groups bearing the food choices to be consumed at each meal, positioning said selected movable members into the third column of said meal display zone with the members of said selected movable members in said third column matching the number of units of each of said food groups marked in said second column of said meal zones, and whereby individuals may easily and conveniently select and control their intake of all food groups and portions of food within each group to prescribed quantities of food and types of food to maintain a predetermined diet control.

* * * * *